(No Model.) 3 Sheets—Sheet 1.

C. G. CURTIS & F. B. CROCKER.
DYNAMO ELECTRIC MACHINE OR MOTOR.

No. 354,538. Patented Dec. 21, 1886.

Fig. 2ª

Witnesses
Geo. W. Breck.
William H. Dwyer

Inventors
Charles G. Curtis
Francis B. Crocker.

(No Model.) 3 Sheets—Sheet 2.

C. G. CURTIS & F. B. CROCKER.
DYNAMO ELECTRIC MACHINE OR MOTOR.

No. 354,538. Patented Dec. 21, 1886.

Witnesses
Geo. W. Breck.
William L. Dreyer

Inventors
Charles G. Curtis
Francis B. Crocker.

(No Model.) 3 Sheets—Sheet 3.

C. G. CURTIS & F. B. CROCKER.
DYNAMO ELECTRIC MACHINE OR MOTOR.

No. 354,538. Patented Dec. 21, 1886.

Witnesses
Geo. W. Breck.
William C. Dreyer

Inventors
Charles G. Curtis
Francis B. Crocker

UNITED STATES PATENT OFFICE.

CHARLES G. CURTIS AND FRANCIS B. CROCKER, OF NEW YORK, N. Y., ASSIGNORS TO THE C. & C. ELECTRIC MOTOR COMPANY.

DYNAMO-ELECTRIC MACHINE OR MOTOR.

SPECIFICATION forming part of Letters Patent No. 354,538, dated December 21, 1886.

Application filed March 4, 1886. Serial No. 194,020. (No model.)

*To all whom it may concern:*

Be it known that we, CHARLES G. CURTIS and FRANCIS B. CROCKER, both of the city, county, and State of New York, have invented certain Improvements in Dynamo-Electric Machines and Electric Motors, of which the following is a specification.

The principal object of this invention is to provide an armature for dynamo-electric machines and electric motors which may be constructed very easily, rapidly, and cheaply, and which may be made almost entirely by machinery.

Figure 2:
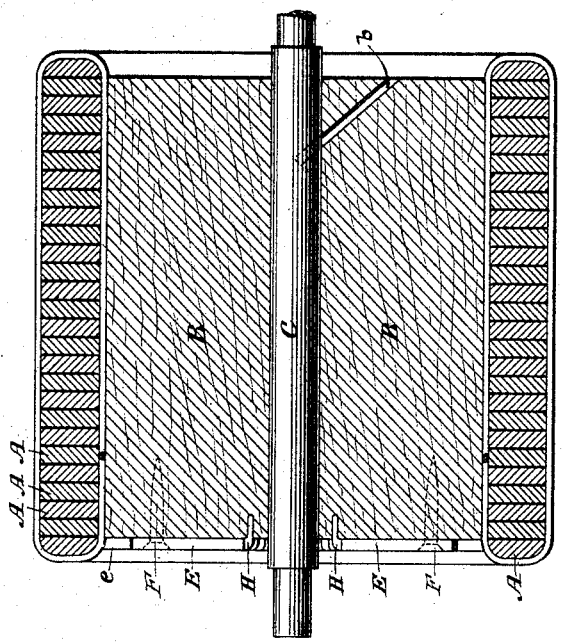
Figure 1:
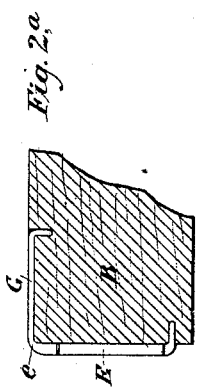
Figure 1:
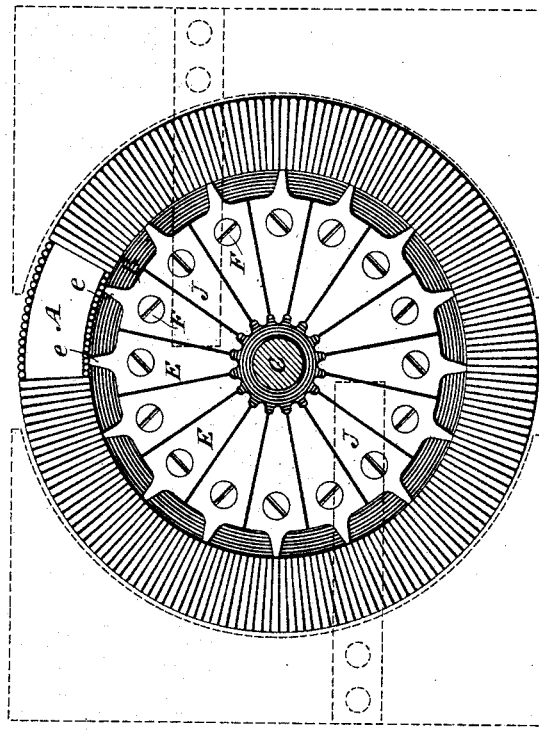
Figure 4:
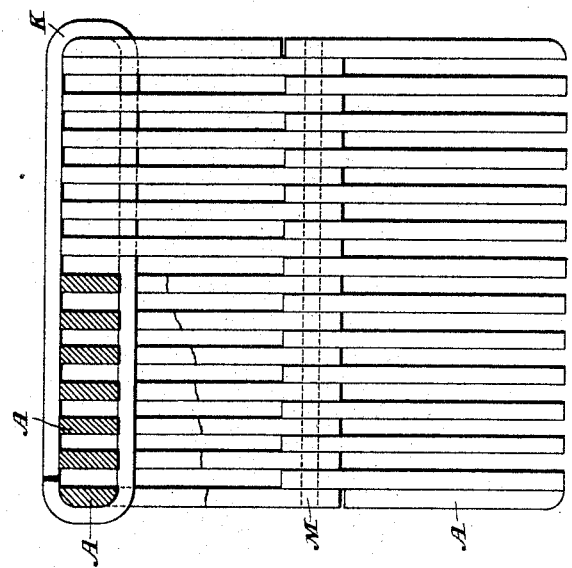
Figure 3:
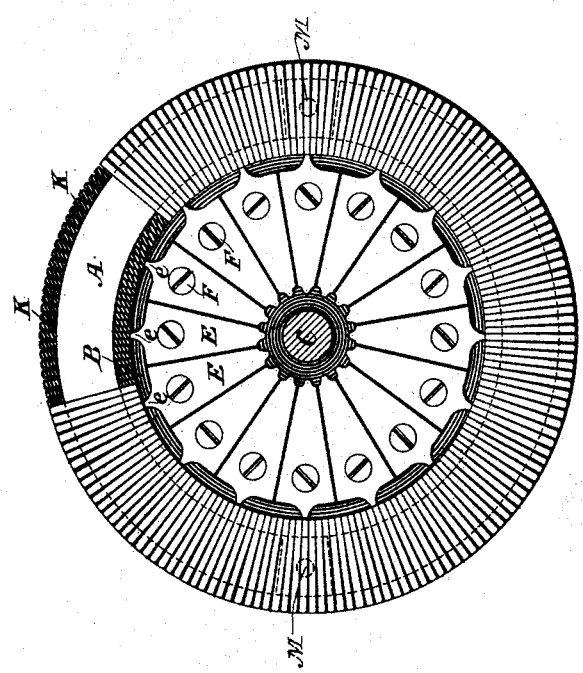
Figure 6:
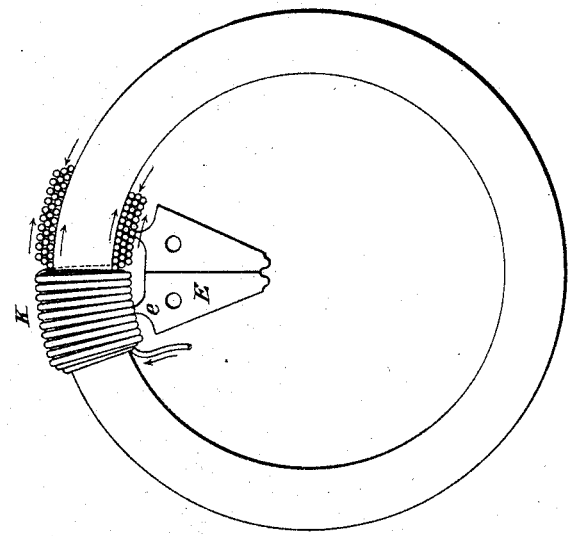
Figure 5:
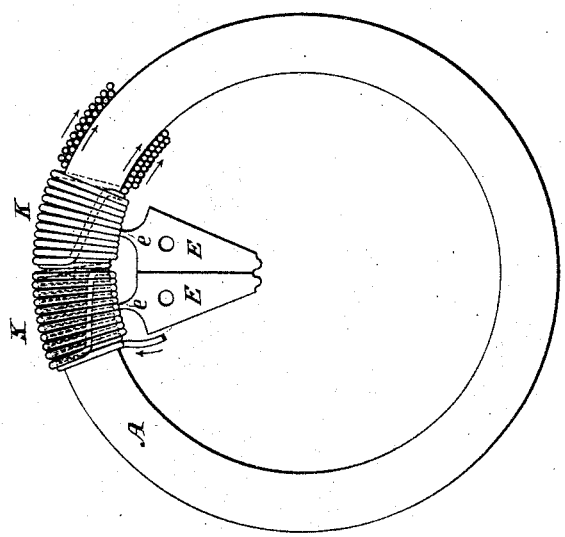

Our invention is represented in the accompanying drawings, in which Figure 1 represents an end view of an armature constructed according to our invention; Fig. 2, a sectional side of the same view through its axis; Fig. 2ª, a detail in section and part of the commutator. Figs. 3 and 4 show modified forms of our armature and winding. Figs. 5 and 6 show other forms of our winding.

We have shown our armature in the Gramme ring form, though parts of our invention are applicable to other forms of armature.

The iron core or ring of the armature to which we apply our improved form of winding may be built up or formed in any desirable way. It may be composed, for example, of a series of iron rings or washers, A A A, &c., of any desirable size and thickness, separated from each other by spaces or by insulating material, to prevent the generation of Foucault currents; or the core may be built up of a series of half-rings of iron, with their ends alternately fitted into one another and connected by pins passing through junctions at the opposite ends of the diameter, according to our invention, as shown in Fig. 4. These rings may readily be punched or stamped out of sheet-iron. Upon the iron core thus formed we wind or apply the wire or conductor of the desired size, which may be a covered conductor or not, as preferred, and which we make in the form of a continuous unbroken winding or conductor without bringing out separate ends to connect with the separate commutator-bars, as clearly shown in the drawings. This winding may be done by hand or by machinery, and the ring may be wound in one continuous winding the whole way around the ring, in which case the ends where they come together would be electrically connected; or if the iron ring be made in two halves mortised together, as shown in Fig. 4, the two halves of the ring may be made separately and the two halves then brought together and fastened by the pins, and then the ends of the winding properly connected, thus forming a ring with a practically continuous winding.

The ring thus formed may be mounted upon its shaft in various ways; but we have devised an extremely simple and cheap mounting, which serves at the same time as a mounting for the commutator. It consists of a block or drum, B, made of wood, fiber, and any other desirable material, which is rigidly attached to the shaft C by a pin, b, for example, and is turned off on the outside, so as to fit tightly into the wound ring. To further prevent the ring from slipping on the drum, shellac or some other adhesive and insulating substance may be applied when the winding and the drum come together, which will stick the ring fast to the drum. The end of the drum B is faced off to form a mounting for the commutator, which may be constructed in different ways, but which we form of a number of copper sector-shaped strips or sections, E E, &c., attached to the face of the drum B. These copper strips may be attached to the drum by screws F at their outer ends, and lugs H, which enter the drum at their inner ends, as shown in Figs. 1 and 2, and the outer ends may be formed with fingers or hooks G, which extend back in slots and hook into the drum B, so as to avoid the use of screws, as we have shown in Fig. 2ª. The commutator-strips E we form with projections or extensions $e\ e$, which reach to and come in contact with the winding, so as to make connection with it in any convenient manner. If the winding be a covered or insulated wire, the insulation is scraped off at these points, so that the copper commutator-strip rests in contact with the wire itself, and to insure a good and reliable connection the junction may readily be soldered. If the commutator-strips are formed with projecting fingers, as shown in Fig. 2ª, then the insulation may be scraped off the winding, so that the wire will be exposed to the fingers G, which will insure a good connection, and may render soldering unnecessary. The projections or parts *e e* of the commutator-strips, which rest in contact and connect with the winding, need not be so arranged that each one comes in exactly the right position to connect with only one convolution, for if any of them should happen to overlap or touch two adjacent convolutions it will only have the effect of cutting out and making ineffectual a single convolution, the effect of which would be immaterial. By means of this arrangement, in which the armature-winding is composed of a continuous unbroken wire or conductor, with which the commutator-strips are directly connected, we are enabled to construct an armature divided up electrically into the desired number of sections without the necessity of bringing out the ends of the section separately or otherwise connecting them with the commutator-strips. To connect with this form of commutator, we construct the brushes J J so that their edges which rest on the commutator stand oblique, or at more or less of an angle, to the slots or cracks between the adjacent commutator-strips, as shown in dotted lines. The effect of this arrangement is, that the brushes, even if they are made up of thin laminæ, bridge over these cracks and allow the armature to be turned in either direction without injury to the brushes.

We have shown the brushes set with a slight negative lead, and the desired obliquity of the brush-edges to the commutator-spaces may easily be obtained by making the brushes of the proper length and setting them at the proper position.

In Figs. 3 and 4 we have shown a modification of our winding. In order to obtain the maximum number of turns or convolutions of winding with a given resistance, instead of employing an ordinary round wire, we form the winding of a conductor or flattened wire or ribbon having a more or less rectangular cross-section, which we wind on edge or with its longest dimension at right angles to the core, as clearly represented in Figs. 3 and 4, the successive turns being insulated from each other by proper spacing or by layers of insulating material, or by insulation covering the whole conductor and applied before the conductor is wound upon the core. In this form of winding, like that we have shown in Figs. 1 and 2, the iron core may be made of a complete ring and the winding applied by hand or by machine; or the iron core may be made in two half-rings, each half being wound separately and then brought together, so as to connect the cores magnetically and the winding electrically, thus forming a complete ring with a practically continuous winding. The drum B may then be inserted in the ring, and the commutator-strips brought in contact with the winding and properly connected and soldered, if desired. The thickness of the copper ribbon or conductor which forms the winding, and which may be made of any size and shape, evidently determines the number of turns that can be wound upon the armature, and the width of the copper ribbon or conductor—that is, its dimension at right angles to the core—also determines the area of its cross-section, and consequently its resistance, so that by making the conductor or ribbon of greater width than thickness, and by further, if desired, making it more or less rectangular in cross-section, so as to fill the entire winding-space with copper, we are enabled not only to obtain a ring or armature having a greater number of turns with a given resistance or a given number of turns with a less resistance, and wound with only a single layer of winding, which is a very important point, but at the same time to reduce the space occupied and obtain the highest possible effectiveness of the armature-winding, in consequence of which the space between the armature-core and the field-magnets may be reduced.

The form of core shown in Figs. 3 and 4, which we have devised to enable the ring to be wound in two halves, is built up of a series of half-rings, A A A, &c., properly spaced apart, so that the ends of each set of half-rings will fit into the spaces between those of the other set. The ends of the rings are provided with holes at the opposite ends of a diameter, and after each half of the core has been wound the two halves are brought together, so that the ends of the rings interlock and are mechanically and magnetically united by pins M, passed through the holes.

It is obviously not necessary in our continuous armature-winding that the ring or armature itself should be mounted in any particular way, or that any special form of commutator should be employed, or that the commutator-strips be given any particular shape.

Fig. 5 shows another form of our continuous winding, in which the winding is divided up into sections, each composed of two layers. According to this arrangement one layer of a section is wound on, and then the wire is brought back along the end of the ring to the starting end of the section, and a second layer is then wound upon the first, as shown. In winding on the first layer there are spaces or grooves of more or less width left between the convolutions on the outside, because the outside circumference of the ring is somewhat greater than the inside circumference. Consequently, when the second layer is wound upon the first, the wire may be laid so that the convolutions on the outside of the ring lie in these spaces or grooves. This enables the winding to be more easily and neatly done and reduces the space occupied by the outside winding to a minimum. After the second layer is applied in this way, the next section is wound in the same way, the wire of the preceding section leading directly without any break from the outer layer of one section to the inner layer of the next section, so that the winding is continuous or unbroken with respect to the sections. In the same way all the sections of the entire ring, or all the sections of each half-ring—if that way of making the ring is preferred—or as many as desired, may be wound, all the sections being composed of a single continuous wire or conductor of the desired size and shape. The commutator strips or sections E E, &c., may then be connected, respectively, with the successive sections of winding, so as to divide the winding electrically into sections in any desirable way. A simple way of doing this is to form the commutator-strips with extensions e e, which reach to and touch, or touch sufficiently to be soldered, if desired, directly to some part of the winding of each section, as clearly shown in Fig. 5. By this arrangement of winding we are enabled to wind on more than a single layer, and at the same time to form the winding of an unbroken wire or conductor wound continuously in sections, to which the commutator-strips may be directly connected, if desired, so that the necessity of forming the wire in separate or disconnected sections and of bringing out the ends of the sections or forming loops, or otherwise disturbing the uniformity or continuousness of the winding in order to make the connections to the commutator-strips, is avoided, and the simplicity and cheapness of the machine thereby very greatly increased.

In Fig. 6 we have shown still another method of our continuous winding, in which any desired number of layers are wound on successively in each section, the successive layers being wound on upon one another from left to right, and vice versa alternately—that is, one layer of a section is wound on first from left to right, as shown, for example; then the second layer is wound upon the first in the opposite direction; then a third layer is wound upon the second from left to right again, which brings the wire to the end of that section, from which it leads directly to the inside layer of the next section, which is formed in the same way. Instead of beginning the winding of the next section after three layers have been wound in one section, five or seven or any desired odd number of layers may be applied in the same way; or if an even number of layers be required the wire after the last layer is applied may be carried along the end of the ring to the beginning of the next section, like the arrangement shown in Fig. 5 in this respect. It is not necessary, and it may not be desirable, that the wire should be wound on in layers or regularly in any way, especially in cases where fine wire and a large number of turns are required, and in such cases the turns may be wound upon one another without regard to any arrangement or regular order until the space to be occupied by each section has been wound full, when the wire will lead directly into the next section. The commutator-strips in this arrangement of winding, like that shown in Fig. 5, may be connected with the successive sections of the continuous winding in any desired manner, according to our arrangement shown in Figs. 5 and 6, for example, in which the commutator-strips are provided with extensions e, reaching to and soldered or otherwise connected directly to one of the turns or convolutions of each section.

It is evident that in our continuous winding the wire or conductor may be of any desired size or shape, and if the winding be done in sections the sections may be of any desired size and number, and that the winding may be continuous with respect to the entire ring or all the sections, or with respect to any number of the sections, two or more.

We are aware that in English Patent No. 3,880 of 1881 there is described an armature having a winding formed of a flat copper wire or conductor, and we do not claim such a winding.

What we claim as our invention, and desire to secure by Letters Patent, is—

1. In an armature for dynamo-electric machines or electric motors, the combination of a winding consisting of a continuous unbroken wire or conductor wound continuously with respect to two or more sections, and commutator strips or sections having extensions formed as a part of the commutator-strip and connected directly with certain turns or convolutions of said winding, whereby the said winding is electrically divided into the desired sections.

2. In a ring-armature for dynamo-electric machines or electric motors, the combination, with the wound ring, of a ring-mounting consisting of a drum or block fitted into the space between said ring and the shaft and rigidly attached to both, and commutator strips or segments attached to or mounted upon the end or face of the said drum.

3. In a ring-armature for dynamo-electric machines or electric motors, the combination, with the core having a winding consisting of a continuous unbroken wire or conductor, of a ring-mounting consisting of a drum or block fitted into the space between said ring and the shaft and rigidly attached to both, and commutator strips or segments attached to or mounted upon the end or face of said drum, and having extensions connected directly with certain points of the winding.

4. Commutator strips or sections for dynamo-electric machines or electric motors, mounted upon an insulating block or support and having hooked projections formed integral with said strips, which project and hook into said insulating-support and act to hold the strips in place.

5. In a dynamo-electric machine or electric motor, the combination of the insulating block or support B, upon which the armature-ring is mounted, and the commutator-strips E, attached to the face of said insulating-support, said strips having the projections H, which enter said support and serve to hold the strips in place.

6. In a dynamo-electric machine or electric motor, an armature-winding consisting of a wire or conductor wound in two or more layers, the wire being brought back at each layer, so that all the layers are helices of the same kind, (i. e., dextrorsal or sinistrorsal, as the case may be,) and the convolutions of one layer fit into the interstices of the one beneath.

7. In a dynamo-electric machine or electric motor, the combination, with a commutator having a flat face or faces practically at right angles to the axis, of commutator-brushes which bear upon the commutator at their edges or points, and are set so that their edges or lines of contact are oblique to the cracks or spaces between the commutator-strips, so as to bridge over these spaces and allow the armature to be turned in either direction without injury to the brushes.

CHARLES G. CURTIS.
FRANCIS B. CROCKER.

Witnesses:
WILLIAM C. DREYER,
CHAS. J. MAGUIRE.